United States Patent
Al-Taq et al.

(10) Patent No.: US 10,927,291 B2
(45) Date of Patent: *Feb. 23, 2021

(54) COMPOSITIONS FOR TREATING A SUBTERRANEAN FORMATION WITH A FOAMED SYSTEM AND CORRESPONDING METHODS

(71) Applicant: Saudi Arabian Oil Company, Dhahran (SA)

(72) Inventors: Ali Abdullah Al-Taq, Qatif (SA); Zuhair A. Al-Yousif, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,887

(22) Filed: Jul. 24, 2019

(65) Prior Publication Data

US 2021/0024813 A1    Jan. 28, 2021

(51) Int. Cl.
*E21B 43/267* (2006.01)
*C09K 8/70* (2006.01)
(Continued)

(52) U.S. Cl.
CPC .............. *C09K 8/703* (2013.01); *C09K 8/665* (2013.01); *C09K 8/80* (2013.01); *E21B 43/267* (2013.01)

(58) Field of Classification Search
None
See application file for complete search history.

(56) References Cited

U.S. PATENT DOCUMENTS

| 4,232,741 A | 11/1980 | Richardson et al. |
| 4,737,296 A | 4/1988 | Watkins |

(Continued)

FOREIGN PATENT DOCUMENTS

| CN | 108690595 A | 10/2018 |
| RU | 2197606 C1 | 1/2003 |

(Continued)

OTHER PUBLICATIONS

Office Action dated Dec. 26, 2019 pertaining to U.S. Appl. No. 16/520,907, filed Jul. 24, 2019, 20 pgs.
(Continued)

*Primary Examiner* — Andrew Sue-Ako
(74) *Attorney, Agent, or Firm* — Dinsmore and Shohl LLP

(57) ABSTRACT

A method for treating a subterranean formation with a foamed system is disclosed. The method includes introducing a fracturing fluid into the formation. The fracturing fluid includes a first solution and a second solution. The first solution includes an ammonium containing compound. The second solution includes a nitrite containing compound. One or both of the solutions further include a foaming agent. The solutions are mixed within the formation to generate a nitrogen gas. The method further includes, allowing the compounds to generate nitrogen in the presence of the foaming agent to form a foam and generate the foamed system within the formation. Generation of the foamed system produces sufficient pressure from volumetric expansion to generate fractures in the formation. The fractures are held open with a proppant provided with the fracturing fluid to create a conductive path for production of fluids from the formation to the wellbore.

14 Claims, 3 Drawing Sheets

(51) Int. Cl.
*C09K 8/66* (2006.01)
*C09K 8/80* (2006.01)

(56) References Cited

U.S. PATENT DOCUMENTS

| | | | |
|---|---|---|---|
| 4,846,277 | A | 7/1989 | Khalil et al. |
| 7,148,184 | B2 | 12/2006 | Francini et al. |
| 7,464,754 | B1 | 12/2008 | Decker et al. |
| 9,701,894 | B2 | 7/2017 | Al-Nakhli et al. |
| 2004/0177960 | A1 | 9/2004 | Chan et al. |
| 2007/0235189 | A1 | 10/2007 | Milne et al. |
| 2009/0281005 | A1 | 11/2009 | Qu et al. |
| 2013/0126169 | A1 | 5/2013 | Al-Nakhli et al. |
| 2013/0180720 | A1 | 7/2013 | Al-Dahlan et al. |
| 2015/0000912 | A1 | 1/2015 | Choudhary et al. |
| 2015/0300143 | A1 | 10/2015 | Al-Nakhli et al. |
| 2015/0361328 | A1 | 12/2015 | Almutairi |
| 2016/0265326 | A1* | 9/2016 | Nguyen ............ C09K 8/62 |
| 2016/0319182 | A1 | 11/2016 | Al-Nakhli et al. |
| 2017/0145303 | A1 | 5/2017 | Fontenelle et al. |
| 2018/0291720 | A1 | 10/2018 | Cairns et al. |

FOREIGN PATENT DOCUMENTS

| | | |
|---|---|---|
| WO | 2013109768 A1 | 7/2013 |
| WO | 2013181229 A2 | 12/2013 |
| WO | 2014149524 A1 | 9/2014 |
| WO | 2017058193 A1 | 4/2017 |
| WO | 2018187565 A1 | 10/2018 |

OTHER PUBLICATIONS

Davies et al., "Carbonate Stimulation", Middle East & Asia Reservoir Review, 2007, 7 pgs.

Al-Nakhli et al., "Chemically-Induced Pressure Pulse: A Novel Fracturing Technology for Unconventional Reservoirs", Society of Petroleum Engineers, 2015, 14 pgs.

Al-Nakhli et al., "Overcoming Unconventional Gas Challenges by Creating Synthetic Sweetspot and Increasing Drainage Area", Society of Petroleum Engineers, 2013, 15 pgs.

Nguygen et al., "Kinetics and mechanism of the reaction between ammonium and nitrite ions: experimental and theoretical studies", Chemical Engineering Scient 58 (2003) 4351-4362, 12 pgs.

Glasbergen et al., "Injectivity Loss in Polymer Floods: Causes, Preventions and Mitigations", Society of Petroleum Engineers, 2015, 15 pgs.

Yerramilli et al., "Novel Insight into Polymer Infectivity for Polymer Flooding", Society of Petroleum Engineers, 2013, 23 pgs.

Farajzadeh et al., "Simultaneous Sorption and Mechanical Entrapment During Polymer Flow Through Porous Media", Society of Petroleum Engineers, 2015, 24 pgs.

Sanchez et al., "Acid Fracturing Tight Gas Carbonates Reservoirs Using CO2 to Assist Stimulation Fluids: An Alternative to Less Water Consumption while Maintaining Productivity", Society of Petroleum Engineers, 2015, 13 pgs.

International Search Report and Written Opinion dated Mar. 31, 2020 pertaining to International application No. PCT/US2019/056708 filed Oct. 17, 2019, 13 pgs.

International Search Report and Written Opinion dated Jul. 16, 2020 pertaining to International application No. PCT/US2020/024150 filed Mar. 23, 2020, 13 pgs.

Office Action dated Jun. 24, 2020 pertaining to U.S. Appl. No. 16/520,907, filed Jul. 24, 2019, 26 pgs.

Office Action dated Jul. 7, 2020 pertaining to U.S. Appl. No. 16/412,962, filed May 15, 2019, 29 pgs.

Office Action dated Jul. 27, 2020 pertaining to U.S. Appl. No. 16/851,589, filed Apr. 17, 2020, 25 pgs.

International Search Report and Written Opinion dated Aug. 5, 2020 pertaining to International application No. PCT/US2020/032064 filed May 8, 2020, 13 pgs.

International Search Report and Written Opinion dated Jul. 20, 2020 pertaining to International application No. PCT/US2020/030353 filed Apr. 29, 2020, 13 pgs.

* cited by examiner

COMPOSITIONS FOR TREATING A SUBTERRANEAN FORMATION WITH A FOAMED SYSTEM AND CORRESPONDING METHODS

TECHNICAL FIELD

The present disclosure relates to treating a subterranean formation to increase hydrocarbon production.

BACKGROUND

Conventional fracturing fluids used in hydraulic fracturing treatments often have poor fluid loss control and increased formation damage potential due to residual material remaining after fracturing operations. Many reservoirs also require nitrogen gas to initiate post-fracturing flow-back. However, reservoirs treated with foamed systems have shown easier flow-back initiation and increased productivity. Foamed systems are used in hydraulic fracturing treatments due to offering several advantages compared to traditional non-foamed systems such as reduced fluid content, superior fluid loss control, increased viscosity, less friction, and quicker cleanup.

SUMMARY

Foamed systems are conventionally produced by injecting a gas into a fracturing fluid system that contains a foaming agent. Gas may be injected into a system already present within the subterranean formation, injected into the subterranean formation simultaneously with the system, or injected into the system prior to injection into the subterranean formation. The direct injection of a gas or previously generated foam into a subterranean formation consumes significant amounts of energy due to the challenges of pumping a gas or viscous foam at a sufficient rate. Further, foamed systems may not be achievable using such conventional methods during hydraulic fracturing treatments within some subterranean formations. This may be due to various factors, such as the limitations of pumping equipment and the necessity of achieving the required injection rates during treatments. For example, as the maximum achievable pressure increases, the rate at which gas may be injected into a subterranean formation decreases dramatically. As such, conventional methods may fail to achieve a foamed system within some subterranean formations, resulting in the treatment of the subterranean formation with an energized fluid system. Energized fluid systems lack many of the benefits of a foamed system, such as increased transport capability, due to the decreased viscosity when compared to a foamed system. Prior attempts to achieve a foamed system in some subterranean formations have resulted in only energized fluids with an average foam quality of from about 6.5% to about 10.3%, less than the average foam quality of about 52% necessary to achieve a foamed system.

Accordingly, a need exists for alternative methods that readily generate a viscous foamed system that may be used in the treatments of subterranean formations. To this end, the embodiments described in the present disclosure disclose a method for treating a subterranean formation with a foamed system that can overcome such limitations by the in-situ generation of the gas required to form a foamed system subsequent to injection within the subterranean formation. Specifically, the foamed system is generated within the formation reducing or eliminating the difficult task of transporting or pumping a gas or foam deep within the formation.

According to one embodiment, a method for treating a subterranean formation with a foamed system is provided. The method includes introducing a fracturing fluid into the formation. The fracturing fluid includes a first solution and a second solution. The first solution includes an ammonium containing compound. The second solution includes a nitrite containing compound. One or both of the solutions further include a foaming agent. The solutions are mixed within the formation to generate a nitrogen gas. The method further includes allowing the compounds to generate nitrogen in the presence of the foaming agent to form a foam and to generate the foamed system within the formation. Generation of the foamed system produces sufficient pressure from volumetric expansion to generate fractures in the formation. The fractures are held open with a proppant provided with the fracturing fluid to create a conductive path for production of fluids from the formation to the wellbore.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
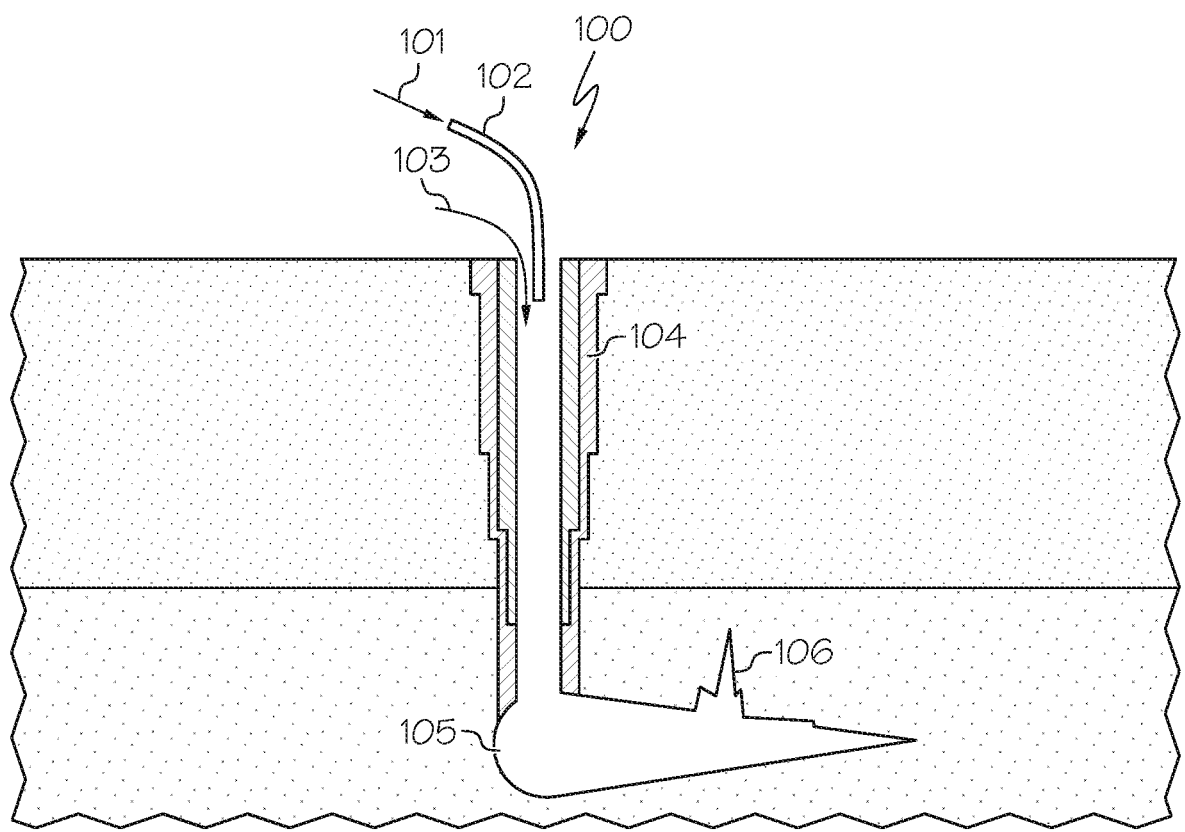
FIG. 1 is a schematic drawing of a wellbore used for hydraulic fracturing treatment operations.

Reference will now be made in greater detail to various embodiments, some embodiments of which are illustrated in the accompanying drawings.

DETAILED DESCRIPTION

Reference will now be made in detail to embodiments of a method and associated composition for treating a subterranean formation with a foamed system.

As used throughout this disclosure, the term "foam quality" refers to the ratio of the volume of gas to the total volume of gas and liquid in a foamed system.

As used throughout this disclosure, the term "energized fluid system" refers to a fracturing fluid that includes at least one compressible, sometimes soluble, gas phase. The foam quality of an energized fluid system is less than 52%.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing.

As used throughout this disclosure, the term "hydraulic fracturing" refers to a stimulation treatment routinely performed on hydrocarbon wells in low-permeability reservoirs, such as reservoirs with a permeability of less than 10 milliDarcys (mD). Hydraulic fracturing fluids are pumped into a subsurface formation, causing a fracture to form or open. The wings of the fracture extend away from the wellbore in opposing directions according to the natural stresses within the subsurface formation. Proppant may be mixed with the fracturing fluid to keep the fracture open when the treatment is complete. Hydraulic fracturing creates communication with a subsurface formation and bypasses damage that may exist in the near-wellbore area.

As used throughout this disclosure, the term "proppant" refers to particles mixed with fracturing fluids to hold fractures open after the pressure generated during a hydraulic fracturing treatment is relieved. In addition to naturally occurring sand grains, man-made or specially engineered proppants, such as resin-coated sand, or high-strength ceramic materials, such as sintered bauxite, may also be used. Proppant materials are carefully sorted for size and sphericity to provide an efficient conduit for production of fluid from the reservoir to the wellbore.

As used throughout this disclosure, the term "reservoir" refers to a subsurface formation having sufficient porosity and permeability to store and transmit fluids.

As used throughout this disclosure, the term "subterranean formation" refers to a body of rock that is sufficiently distinctive and continuous from the surrounding rock bodies that the body of rock can be mapped as a distinct entity. A subterranean formation is, therefore, sufficiently homogenous to form a single identifiable unit containing similar properties throughout the subterranean formation, including, but not limited to, porosity and permeability. A subterranean formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall or the rock face that bounds the drilled hole.

A method and composition for treating a subterranean formation with a foamed system is provided by the present disclosure. A first step includes introducing a fracturing fluid into the subterranean formation. The fracturing fluid includes a first solution and a second solution. The first solution includes an ammonium containing compound and the second solution includes a nitrite containing compound. One or both of the first solution and the second solution further include a foaming agent. The first solution and the second solution are mixed within the subterranean formation. A second step comprises maintaining the fracturing fluid in the subterranean formation such that the ammonium containing compound and the nitrite containing compound react to generate nitrogen gas. Upon the generation of the nitrogen gas, the foaming agent is operative to generate a foam. The generated foam interacts with the subterranean formation in order to create a conductive path between the subterranean formation and the wellbore.

In the methods of the present disclosure, a fracturing fluid is introduced into a subterranean formation. For example, the treatment fluid may be injected into the subterranean formation through the wellbore accessing the formation. The fracturing fluid includes a first solution and a second solution. The first solution includes an ammonium containing compound. In some embodiments, the ammonium containing compound is an ammonium salt. For example, in some embodiments the ammonium containing compound is ammonium chloride ($NH_4Cl$), ammonium bromide ($NH_4Br$), ammonium nitrate ($NH_4NO_3$), ammonium nitrite ($NH_4NO_2$), ammonium sulfate (($NH_4)_2SO_4$), or ammonium carbonate (($NH_4)_2CO_3$). The second solution includes a nitrite containing compound. In some embodiments, the nitrite containing compound is a nitrite salt. For example, in some embodiments the nitrite containing compound is sodium nitrite ($NaNO_2$) or potassium nitrite ($KNO_2$). In some embodiments, the second solution is substantially free of acid prior to being introduced into the subterranean formation. "Substantially free" means that the second solution includes less than 5% by volume, less than 4% by volume, less than 3% by volume, less than 2% by volume, less than 1% by volume, or less than 0.1% by volume of an acid. Acid present in the second solution may result in undesirable nitric oxide and side product generation when the acid is mixed with the nitrite containing compound.

In some embodiments, the molar ratio of the nitrite containing compound to the ammonium containing compound in the fracturing fluid is from 1:1 to 3:1. For example, in some embodiments the molar ratio of $NaNO_2$ to $NH_4Cl$ in the fracturing fluid is from 1:1 to 3:1; from 1.5:1 to 3:1; from 2:1 to 3:1; from 2.5:1 to 3:1; from 1:1 to 2.5:1; from 1:1 to 2:1; from 1:1 to 1.5:1; from 1.5:1 to 2.5:1; from 1.5:1 to 2:1; or from 2:1 to 2.5:1. A greater molar ratio of $NaNO_2$ relative to $NH_4Cl$ allows for an increased reaction rate. Additionally, a $NaNO_2$ to $NH_4Cl$ molar ratio of at least 2:1 allows for the first solution and the second solution containing the reactants to be provided in a volume ratio of 1:1, which may provide practical industrial benefits. The concentration of $NaNO_2$ in the second solution and $NH_4Cl$ in the first solution may be selected based on the reaction kinetics of the system, the solubility of the compounds in water based on temperature, and the desired foam characteristics.

One or both of the first solution and the second solution also include a foaming agent. In embodiments, one or both of the first solution and the second solution may include a foaming agent in an amount of from 1 gallon per thousand gallons of solution (gpt) to 20 gpt, from 2.5 gpt to 20 gpt, from 5 gpt to 20 gpt, from 10 gpt to 20 gpt, from 15 gpt to 20 gpt, from 1 gpt to 15 gpt, from 1 gpt to 10 gpt, from 1 gpt to 5 gpt, or from 1 gpt to 2.5 gpt. In some embodiments, the foaming agent comprises a surfactant. Generally, surfactants are chemicals that reduce the surface tension of the fracturing fluid or interfacial tension between fracturing fluids, allowing for foam generation upon the production of nitrogen gas. In embodiments, the surfactant may stabilize the foamed system. Different types of surfactants, such as anionic, cationic, nonionic, amphoteric and zwitterionic surfactants, may be used to produce foam for a variety of applications. As such, the selection of surfactant should be determined by the desired application and the chemistry of the surfactant and foamed system. However, it should be understood that any compound that may stabilize the gas-liquid foamed system may be classified as a surfactant suitable for use in embodiments of the present disclosure.

For example, surface modified nanoparticles may achieve the same stabilization effect as a conventional surfactant. Additionally, other materials, such as polymers and nanoparticles, may be used to improve the efficiency of the surfactant. For example, a polymer may be used to produce a more stable foamed system.

The first solution and the second solution are mixed within the subterranean formation. For example, the first solution and the second solution may first contact and mix upon injection of the first solution and second solution into the subterranean formation. The resulting fracturing fluid is maintained in the subterranean formation, allowing the ammonium containing compound and the nitrite containing compound to react and generate nitrogen gas. For clarity and conciseness, Reaction 1 is described using $NH_4Cl$ as the ammonium containing compound and $NaNO_2$ as the nitrite containing compound. However, it should be understood by a person of ordinary skill in the art that compounds of similar class of reactants will generally react in a similar way as the example reaction schemes shown in Reaction 1. $NaNO_2$ and $NH_4Cl$ react to form nitrogen gas as illustrated by:

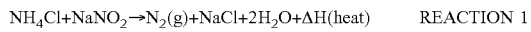
REACTION 1

The chemical equilibrium and reaction dynamics are affected by at least temperature, pressure, pH, and molar ratios of reactants. For example, when the molar ratio of $NaNO_2$ to $NH_4Cl$ is at least 1:1 the reaction may occur spontaneously at a more acidic pH, such as equal to or less than 4.0, or at a temperature equal to or greater than 60° C. In some embodiments, the temperature of the first solution and the second solution is at least 60° C. As such, the generation of nitrogen gas may occur spontaneously upon mixing of the first and second solutions in those embodiments in which the nitrite containing compound comprises $NaNO_2$ and the ammonium containing compound comprises $NH_4Cl$. Therefore, it may be advantageous for the temperature of the first solution and the second solution to be at least 60° C. in embodiments where the fracturing fluid is not sufficiently acidic but in-situ foam generation is still desired. However, if the temperature of the reaction system is too great, the fracturing fluid may generate a foamed system prior to entering the subterranean formation and eliminate the advantages of injecting the fracturing fluid as a liquid. Therefore, it may be advantageous for the fracturing fluid to have a sufficiently cooler temperature until it is injected downhole of the wellbore into the subterranean formation.

Upon generation of the nitrogen gas, the foaming agent present in the fracturing fluid retains the generated nitrogen gas to generate a foamed system. Foamed systems in subterranean formations may be achieved with the in-situ generation of nitrogen gas and the resulting generation of a foamed system due to the operation of a foaming agent. Foamed systems may have an average Foam Quality (FQ) equal to or greater than about 52% once the generation of nitrogen gas has completed.

Systems with a foam quality less than 52% are classified as an energized fluid system. The foam quality of a foam may be calculated by:

$$FQ=VG/(VG+VL) \quad \text{EQUATION 1}$$

where VG is the volume of gas and VL is the volume of liquid. However, due to the volume of gas being dependent on the injection and subterranean formation conditions, foam quality of the foamed system cannot be determined prior to the generation of the system within the formation. Further, where nitrogen gas is generated in-situ, the volume of gas will continue to increase as the reaction of the ammonium containing compound and the nitrite containing compound progresses to completion. As such, foam quality of the generated foamed system should be expected to be greater in portions of the subterranean formation where the ammonium containing compound and the nitrite containing compound are first mixed relative to portions of the subterranean formation that are a greater distance from the wellbore accessing the subterranean formation.

In some embodiments, the foamed system generated by the fracturing fluid has a viscosity sufficient to divert subsequently pumped fracturing fluids, transport additives, such as proppant, or both. In some embodiments, the foamed system generated by the fracturing fluid may have a viscosity great than or equal to 2 centipoise (cP), greater than or equal to 10 cP, greater than or equal to 25 cP, greater than or equal to 50 cP, greater than or equal to 75 cP, or greater than or equal to 100 cP. For example, the foamed system generated by the fracturing fluid may have a viscosity of from 2 cP to 100 cp, from 2 cP to 75 cP, from 2 cP, to 50 cP, from 2 cP to 25 cP, from 2 cP to 10 cP, from 10 cP to 100 cP, from 10 cP to 75 cP, from 10 cP to 50 cP, from 10 cP to 25 cP, from 25 cP to 100 cP, from 25 cP to 75 cP, from 25 cP to 50 cP, from 50 cP to 100 cP, from 50 cP to 75 cP, or from 75 cP to 100 cP. Foamed systems generally have a shear thinning property that causes the viscosity to decrease at increasing shear rates. It is well understood that an increased viscosity will result in a greater fracture width and that a reduced viscosity will result in a greater fracture length. A reduced viscosity may be desirable in order to achieve deep fracture lengths during some acid stimulation treatments. However, many of the advantageous properties a foamed acid system has when compared to a conventional acid treatment are lost if the viscosity is not great enough. Examples of such properties include, but are not limited to, diverting subsequently pumped fracturing fluid away from areas of the subterranean formation that have already been treated and effectively carrying various fluid additives.

The foam generated by the fracturing fluid may be used to stimulate the formations and restore or enhance well production. In some embodiments, the foam generated by the fracturing fluid may be used for a hydraulic fracturing treatment to create a conductive path between the reservoir and the wellbore. In hydraulic fracturing treatments, fracturing fluids are injected at a sufficient pressure and rate into the subterranean formation to be treated to cause fractures to open. In some embodiments, the hydraulic fracturing treatments may create conductive paths in a large area of the formation and bypass any damage that may exist near the wellbore area.

In some embodiments, the fracturing fluid of the method disclosed is introduced into the subterranean formation at a pressure greater than the fracturing pressure of the subterranean formation. When a fracturing fluid is injected into a subterranean formation at a pressure greater than the fracturing pressure of the subterranean formation fractures are induced perpendicular to the horizontal axis of the formation. The wings of such fractures extend away from the wellbore in opposing directions according to the natural stresses within the formation. Proppant present in the fracturing fluid and the subsequently generated foamed system remains in the induced fractures, keeping open paths from the subterranean formation to the wellbore after the pressure is relieved.

In some embodiments of the disclosed method, the first solution and the second solution of the fracturing fluid may be introduced into the subterranean formation simultaneously as a single solution. As disclosed supra, when the reaction conditions, such as pH, temperature, pressure, and molar concentrations, are favorable the generation of the foamed system will occur spontaneously upon mixing of the first solution and the second solution. As the reaction between the ammonium containing compound and the nitrite containing compound progresses, the amount of nitrogen gas and pressure will continue to increase. As such, the foam quality and viscosity of the foamed system will increase. Therefore, in some embodiments it may be advantageous to introduce the first and second solutions simultaneously where a greater foam quality and viscosity are desired and therefore a longer reaction time is required.

In some embodiments, the first step of the method includes introducing the first solution and the second solution into the subterranean formation separately. In some aspects of the embodiments, the first solution is introduced into the subterranean formation through a coiled tubing and the second solution is introduced into the subterranean formation through a production tubing. In some other aspects of the embodiments, the second solution is introduced into the subterranean formation through the coiled tubing and the first solution is introduced into the subterranean formation through the production tubing. In some other aspects of the embodiments, the first solution is introduced into the subterranean formation through a first coiled tubing and the second solution is introduced into the subterranean formation through a second coiled tubing.

FIG. 1 is a schematic drawing of a wellbore 100 used for hydraulic fracturing treatment operations where a first solution 101 is introduced into the subterranean formation 105 through a coiled tubing 102 and a second solution 103 is introduced into the subterranean formation 105 through a production tubing 104. Generally, the coiled tubing 102 can extend just inside or deep into the wellbore 100. The first solution 101 and the second solution 102 are introduced into the subterranean formation 105 at a flow rate such that the pressure created inside the subterranean formation 105 is sufficiently greater than the fracturing pressure of the subterranean formation 105 so as to cause fractures 106. The first solution 101 and the second solution 103 react as disclosed supra to generate a foamed system that may deposit proppant in the fractures 106 to keep them open and provide conductive paths from the subterranean formation 105 to the wellbore 100. Following the treatment, the foamed system breaks, with little risk of damage to the subterranean formation 105, and forms a mixture of liquid and gaseous nitrogen, which facilitates the cleanup process. Damage to the subterranean formation 105 can include the plugging of the pores of the subterranean formation 105 by particles within an injection fluid or by precipitates and sludge formed as a result of acid within the injection fluid reacting with the subterranean formation 105. Such damage may be minimized by the foamed system due to the significant decrease in volume after the system breaks and the decrease in any acid reactivity due to the system.

In some embodiments, the fracturing fluid may further comprise at least one fracturing fluid additive. Examples of fracturing fluid additives include, but are not limited to, corrosion inhibitors, friction reducers, viscosifying agents, gelling polymers, gelling stabilizers, crosslinkers, breakers, and biocide. Corrosion inhibitor is a chemical additive that protects the iron and steel components in the wellbore and the treating equipment from the corrosive fracturing fluid. This protection must remain effective under the anticipated pressure and temperature environments for the duration of the treatment. Crosslinker is a compound, typically a metallic salt, used to create a viscous gel used in some stimulation treatments. The crosslinker reacts with multiple-strand polymers to couple the molecules, increasing but closely controlling the fluid viscosity. Breaker is a chemical used to reduce the viscosity of fracturing fluids either as part of a treatment, such as allowing flow back of the spent fracturing fluid. Breaker may be incorporated into the fracturing fluid for downhole activation. Biocide is an additive that kills bacteria and is commonly used in water muds containing natural starches and gums that are especially vulnerable to bacterial attack. Biocides can be used to control sulfate-reducing bacteria, slime-forming bacteria, iron-oxidizing bacteria and bacteria that attacks polymers in fracture and secondary recovery fluids.

EXAMPLES

The following examples illustrate features of the present disclosure but are not intended to limit the scope of the disclosure.

Example 1

Figure 2:
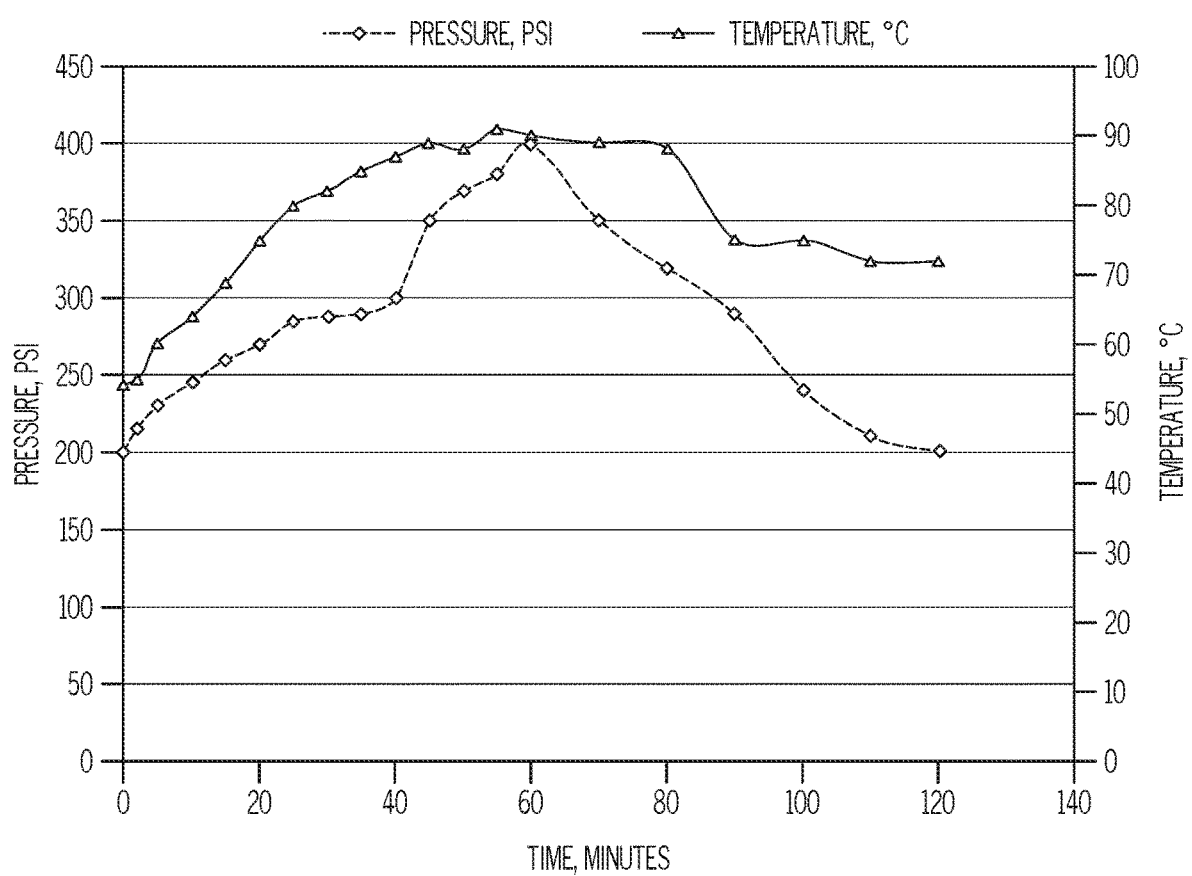
FIG. 2 is a graph illustrating temperature and pressure with respect to time during bench-top scale preparation of an exothermic reaction of ammonium chloride, sodium nitrite and acetic acid, according to one or more embodiments described in this disclosure.

FIG. 2 shows an example in-situ foam generation by reaction of 110 milliliters (mL) of an aqueous solution including 36 mL $NH_4Cl$ mixed with 10 mL $CH_3COOH$ and 64 mL $NaNO_2$. This experiment was conducted using a standard 400 mL "High Temperature, High Pressure" (HT/HP) Cell under static conditions. The cell was first placed in a heating jacket for 20 minutes and allowed to reach 71° C. The reactants were placed inside the cell, which was then closed. The cell was then pressurized to 200 pounds per square inch (psi) to overbalance the pressure and the reaction was allowed to proceed for 2 hours. The temperature and pressure changes associated with the reaction were recorded and are presented in FIG. 2.

Referring to FIG. 2, the curves showing the temperature and the pressure throughout the reaction of $NH_4Cl$, $NaNO_2$, and $CH_3COOH$ are presented. The temperature and pressure increased significantly from 54° C. and 200 psi to 91° C. and 400 psi, respectively, over the span of 60 minutes. The temperature increase is believed to be the result of the exothermic nature of the reaction. As evidenced by FIG. 2, the reaction of $NH_4Cl$ and $NaNO_2$ is capable of generating a substantial increase of pressure within a formation. This pressure increase is believed to be the result of the generation of nitrogen gas as a product of the reaction, as detailed by Reaction 1 supra. This increase in pressure and generation of nitrogen gas may be useful in generating a foam in the presence of a foaming agent as well as increasing the pressure within a subterranean formation. That is, the embodiments of the present disclosure display suitable characteristics for the in situ generation of a foamed system within a subterranean formation. As further evidenced by FIG. 2, the pressure increase may occur over the course of 60 minutes or more. This reaction timeframe may be useful as it allows for positioning the reactants, for example, pumping a first solution and a second solution into a subterranean formation, in a low viscosity liquid-state prior to the increase of pressure and the generation of foam.

Example 2

Foam behavior simulation was conducted to determine viscosity and shear rate values in a simulated foam treatment process under subterranean formation conditions. Specifically, subterranean formation conditions with respect to both temperature and pressure were created for testing of both in-situ gas generated foamed systems in accordance with the present disclosure and conventional foamed systems. This experiment was conducted using a M9200 HT/HP Foam Loop Rheometer system available from Grace Instrument.

The rheometer was first calibrated with Newtonian fluids with a known viscosity to ensure the correct measurement of viscosities and subsequently put under a vacuum to remove all fluids. An $NH_4Cl$ salt solution was first injected into the rheometer, followed by a solution of $NaNO_2$ salt and a methanol surfactant foamer commercially available as F107 from Schlumberger. The molar ratio of the $NaNO_2$ salt to the $NH_4Cl$ salt within the solutions was approximately 2:1. The solutions were then allowed to equilibrate in the rheometer at a temperature of 60° C. The mixture was circulated in the capillary loop of the rheometer to ensure proper mixing and foam formation during the generation of nitrogen gas by the reaction between the two salts. Sample viscosities of the generated foamed system were then measured at different shear rates.

Viscosity ($\mu_{apparent}$) of the generated foamed system was calculated by:

$$\mu_{apparent} = \frac{\tau}{\gamma} \quad \text{EQUATION 2}$$

where $\tau$ is the shear stress calculated by:

$$\tau = \frac{D\Delta P}{4L} \quad \text{EQUATION 3}$$

$\gamma$ is the shear rate calculated by:

$$\gamma = \frac{8V}{D} \quad \text{EQUATION 4}$$

and D is the tube diameter, $\Delta P$ is the differential pressure across the rheometer, L is the tube length, and V is the velocity.

The process was then repeated using a conventional foamed system. After calibration, an aqueous solution containing a foaming agent was injected into the rheometer, followed by an injection of nitrogen gas. A foam was generated in the loop and allowed to equilibrate in the rheometer at a temperature of 60° C. The foam was circulated in the capillary loop of the rheometer to ensure proper foam formation. Sample viscosities of the conventional foamed system were then measured at different shear rates.

Figure 3:
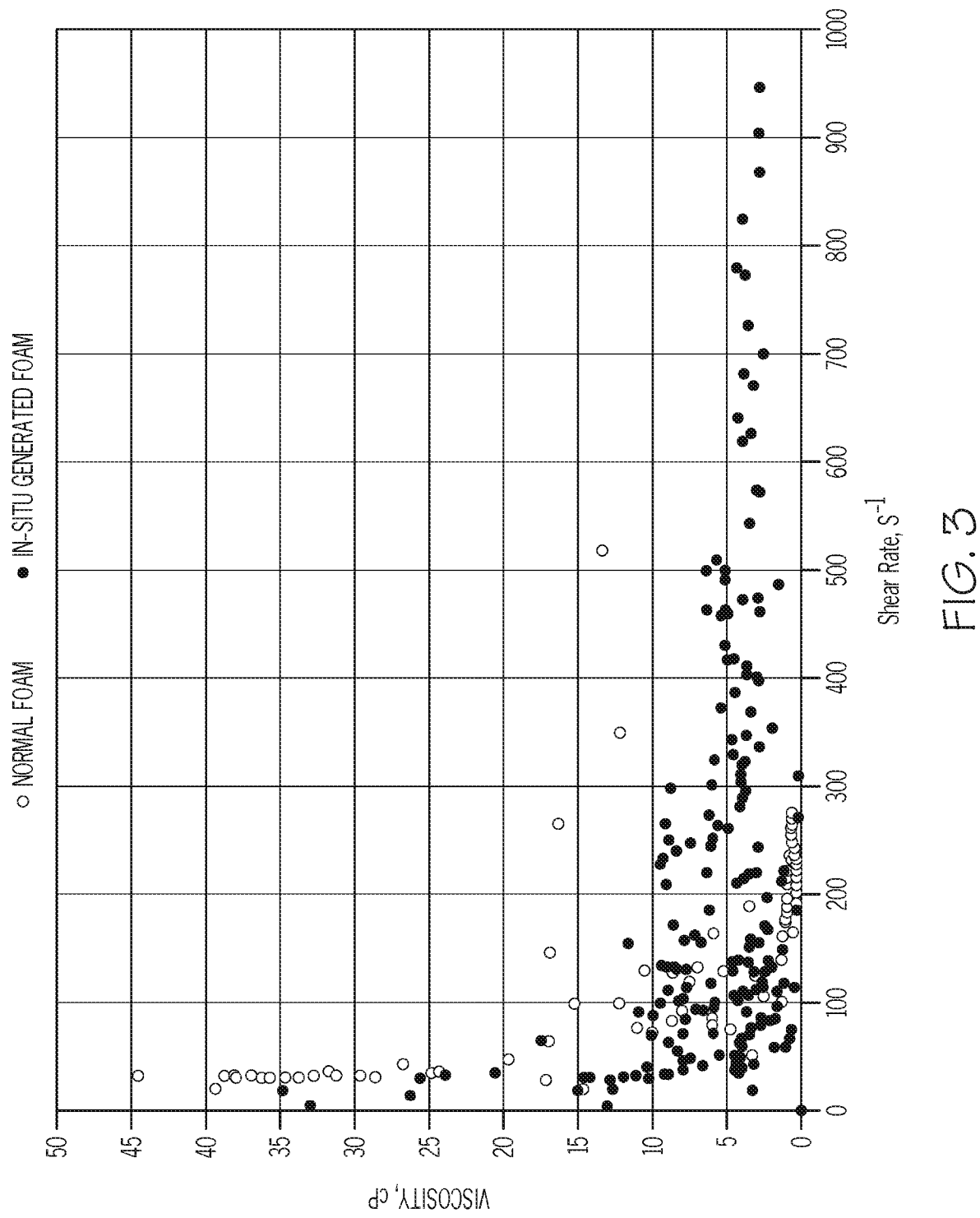
FIG. 3 is a graph comparatively illustrating the viscosity with respect to shear rate of a nitrogen foam system conventionally generated using an external source of nitrogen and a foamed system generated in accordance with one or more embodiments described in this disclosure.

FIG. 3 plots the relationships between viscosity and shear rate at various points as the two foams are constantly circulated and sheared in the loop. Initially, at shear rates from about 0 inverse seconds ($s^{-1}$) to about 100 $s^{-1}$, conventional foam had a maximum viscosity near about 45 cP and an average viscosity near about 35 cP. In-situ gas generated foam had a maximum viscosity near about 35 cP and an average viscosity near about 10 cP. When the shear rate of the system increased from about 100 $s^{-1}$ to about 300 $s^{-1}$, the average viscosity of the conventional foam dropped to about 1 cP while the average viscosity of the in-situ gas generated foam remained near about 10 cP.

As evidenced by FIG. 3, in-situ generated foam is capable of achieving similar or superior viscosities when compared to conventional foam at various shear rates. Further, at lesser shear rates, the conventional foamed systems have a viscosity that will allow for the production of fractures with greater widths and the in-situ gas generated foamed systems have a viscosity that will allow for the production of fractures with greater depth. Further, at greater shear rates, the conventional foamed system displays a significant decrease in viscosity. As discussed previously, this reduced viscosity may prevent the foamed system from diverting the subsequent fracturing fluids as well as reduce the transport capacity of the foam for additives such as proppant. As such, FIG. 3 demonstrates that the method presently disclosed is capable of generating a foamed system within a subterranean formation that displays comparable or superior properties in regard to other systems. That is, the method presently disclosed effectively eliminates the requirements of injecting foam or nitrogen gas without a loss of quality.

It should now be understood that the various aspects of the method and associated fracturing fluid for treating a subterranean formation to increase hydrocarbon production are described and such aspects may be utilized in conjunction with various other aspects.

In a first aspect, the disclosure provides a method for treating a subterranean formation with a foamed system. The method comprises introducing a fracturing fluid into the formation. The fracturing fluid comprises a first solution and a second solution. The first solution comprises an ammonium containing compound. The second solution comprises a nitrite containing compound. One or both of the solutions further comprise a foaming agent. The solutions are mixed within the formation to generate a nitrogen gas. The method further includes allowing the compounds to generate nitrogen in the presence of the foaming agent to form a foam and to generate the foamed system within the formation. Generation of the foamed system produces sufficient pressure from volumetric expansion to generate fractures in the formation. The fractures are held open with a proppant provided with the fracturing fluid to create a conductive path for production of fluids from the formation to the wellbore.

In a second aspect, the disclosure provides the method of the first aspect in which the second solution comprises the foaming agent.

In a third aspect, the disclosure provides the method of the first or second aspects in which the foam quality of the generated foam comprising the reaction products of the first solution and the second solution is at least 52%.

In a fourth aspect, the disclosure provides the method of any of the first through third aspects in which the first solution and the second solution are introduced into the subterranean formation separately. In some embodiments, the first solution may be introduced into the subterranean formation through a coiled tubing and the second solution may be introduced into the subterranean formation through a production tubing. In other embodiments, the second solution may be introduced into the subterranean formation through the coiled tubing and the first solution may be introduced into the subterranean formation through the production tubing. In other embodiments, the first solution may be introduced into the subterranean formation through a first coiled tubing and the second solution may be introduced into the subterranean formation through a second coiled tubing.

In a fifth aspect, the disclosure provides the method of any of the first through fourth aspects in which the nitrite containing compound comprises NaNO$_2$ and the ammonium containing compound comprises NH$_4$Cl.

In a sixth aspect, the disclosure provides the method of any of the first through fifth aspects in which the molar ratio of NaNO$_2$ to NH$_4$Cl is from 1:1 to 3:1.

In a seventh aspect, the disclosure provides the method of any of the first through sixth aspects in which the first solution and the second solution are introduced into the subterranean formation simultaneously as a single solution.

In an eighth aspect, the disclosure provides the method of any of the first through seventh aspects in which the first solution and the second solution are introduced downhole of the wellbore into the subterranean formation simultaneously as a single solution.

In a ninth aspect, the disclosure provides the method of any of the first through eighth aspects in which a temperature of the first solution and the second solution is at least 60° C.

In a tenth aspect, the disclosure provides the method of any of the first through ninth aspects in which the foaming agent comprises a surfactant.

In an eleventh aspect, the disclosure provides the method of any of the first through tenth aspects in which the viscosity of the generated foam comprising the reaction products of the first solution and the second solution is greater than or equal to 2 centipoise (cP).

In a twelfth aspect, the disclosure provides the method of any of the first through eleventh aspects in which introducing the fracturing fluid into the subterranean formation occurs at a pressure greater than the fracturing pressure of the subterranean formation.

In a thirteenth aspect, the disclosure provides the method of any of the first through twelfth aspects in which one or both of the first solution and the second solution further comprises at least one fracturing fluid additive.

In a fourteenth aspect, the disclosure provides the method of any of the first through thirteenth aspects in which one or both of the first solution and the second solution comprises at least one of a corrosion inhibitor, a friction reducer, a viscosifying agent, a gelling polymer, a gelling stabilizer, a crosslinker, a breaker, or a biocide.

In a fifteenth aspect, the disclosure provides a composition for treating a subterranean formation. The composition comprises an ammonium compound, a nitrite compound, and a foaming agent. The ammonium compound and the nitrite compound react to generate nitrogen gas, where upon generation of the nitrogen gas the foaming agent is operative to generate a foam. The generated foam has a foam quality of at least 52% and a viscosity greater than or equal to 2 cP.

In a sixteenth aspect, the disclosure provides the composition of the fifteenth aspect in which the nitrite containing compound comprises NaNO$_2$ or and the ammonium containing compound comprises NH$_4$Cl.

In a seventeenth aspect, the disclosure provides the composition of the fifteenth or sixteenth aspect in which the molar ratio of NaNO$_2$ to NH$_4$Cl is from 1:1 to 3:1.

In an eighteenth aspect, the disclosure provides the composition of any of the fifteenth through seventeenth aspects in which the foaming agent comprises a surfactant.

In a nineteenth aspect, the disclosure provides the composition of any of the fifteenth through eighteenth aspects in which the composition further comprises at least one fracturing fluid additive.

In a twentieth aspect, the disclosure provides the composition of any of the fifteenth through eighteenth aspects in which the fracturing fluid additive comprises at least one of a corrosion inhibitor, a friction reducer, a viscosifying agent, a gelling polymer, a gelling stabilizer, a crosslinker, a breaker, or a biocide.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method for treating a subterranean formation with a foamed system, the method comprising the steps of:
   introducing a fracturing fluid into the subterranean formation at a pressure greater than a fracturing pressure of the subterranean formation to generate fractures in the subterranean formation, the fracturing fluid comprising a first solution and a second solution, in which:
      the first solution comprises an ammonium containing compound comprising an ammonium salt,
      the second solution comprises a nitrite containing compound comprising a nitrite salt,
      one or both of the first solution and the second solution further comprises a foaming agent, and
      the first solution and the second solution are mixed within the subterranean formation to thereby generate a nitrogen (N$_2$) gas; and
   allowing the ammonium containing compound and the nitrite containing compound to generate nitrogen gas in the presence of the foaming agent to form a foam and generate the foamed system within the fractures,
   where generation of the foamed system within the fractures diverts subsequently pumped fracturing fluid away from areas of the subterranean formation that have already been treated, and the fractures are held open with a proppant provided with the fracturing fluid to create a conductive path for production of fluids from the subterranean formation to the wellbore.

2. The method of claim 1, in which the second solution comprises the foaming agent.

3. The method of claim 1, in which the foam quality of the generated foam comprising the reaction products of the first solution and the second solution is at least 52%.

4. The method of claim 1, in which the first solution and the second solution are introduced into the subterranean formation separately with:
   the first solution introduced into the subterranean formation through a coiled tubing and the second solution introduced into the subterranean formation through a production tubing, or
   the second solution introduced into the subterranean formation through the coiled tubing and the first solution introduced into the subterranean formation through the production tubing, or
   the first solution introduced into the subterranean formation through a first coiled tubing and the second solution introduced into the subterranean formation through a second coiled tubing.

5. The method of claim 1, in which the nitrite containing compound comprises $NaNO_2$ or and the ammonium containing compound comprises $NH_4Cl$.

6. The method of claim 5, in which the molar ratio of $NaNO_2$ to $NH_4Cl$ is from 1:1 to 3.1.

7. The method of claim 1, in which the first solution and the second solution are introduced into the subterranean formation simultaneously as a single solution.

8. The method of claim 1, in which the first solution and the second solution are introduced downhole of the wellbore into the subterranean formation simultaneously as a single solution.

9. The method of claim 8, in which a temperature of the first solution and the second solution is at least 60° C.

10. The method of claim 1, in which the foaming agent comprises a surfactant.

11. The method of claim 1, in which the viscosity of the generated foam comprising the reaction products of the first solution and the second solution is greater than or equal to 2 centipoise (cP).

12. The method of claim 1, in which one or both of the first solution and the second solution further comprises at least one fracturing fluid additive.

13. The method of claim 11, in which one or both of the first solution and the second solution comprises at least one of a corrosion inhibitor, a friction reducer, a viscosifying agent, a gelling polymer, a gelling stabilizer, a crosslinker, a breaker, or a biocide.

14. The method of claim 1, in which:
   the first solution comprises the foaming agent in an amount of from 1 gallon per thousand gallons of solution (gpt) to 20 gpt;
   the second solution comprises the foaming agent in an amount of from 1 gpt to 20 gpt; or
   the first solution and the second solution each comprise a foaming agent in an amount of from 1 gpt to 20 gpt.

* * * * *